Patented July 12, 1949

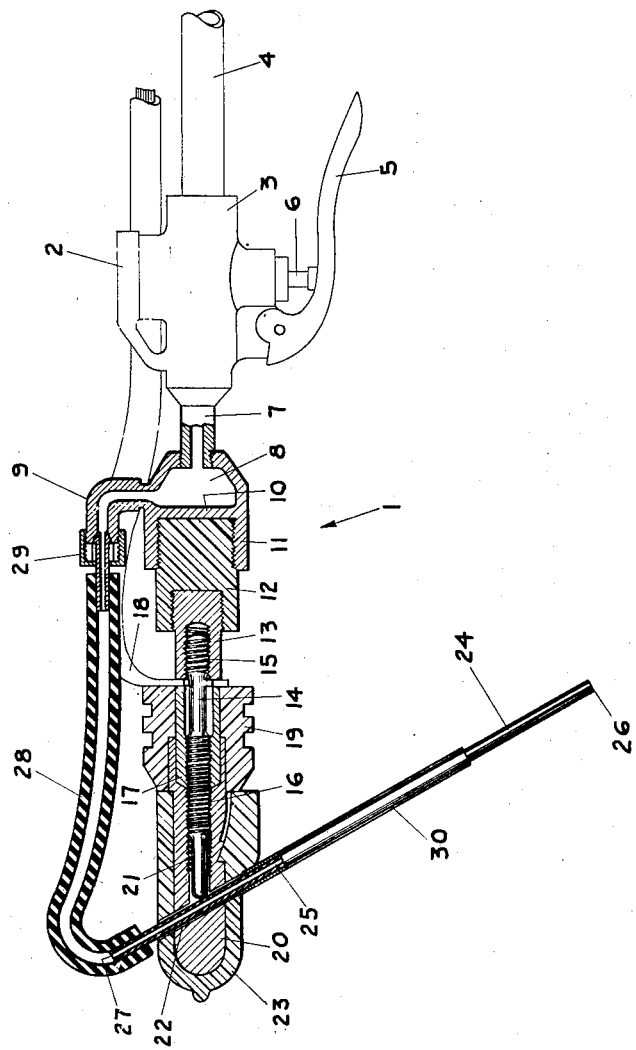

2,475,595

UNITED STATES PATENT OFFICE 2,475,595

CUTTING TORCH

Roscoe C. Hunter, United States Navy, Holden, Utah

Application June 13, 1945, Serial No. 599,292

5 Claims. (Cl. 219—15)

(Granted under the act of March 3, 1883, as amended April 30, 1928; 370 O. G. 757)

This invention relates to a cutting torch and more particularly to a cutting torch of the oxy-arc type adapted to be used in underwater work for cutting steel or other metal objects.

Cutting torches of the oxy-arc type have been used in underwater work heretofore, but those of previously known constructions possess the disadvantage that certain of the parts thereof often burn and the torches are thereby rendered inoperative after only a short period of use.

A cutting torch of the oxy-arc type usually comprises an elongated tubular electrode which is adapted to be electrically connected to a source of electric current of high amperage and through which oxygen gas is adapted to be passed from a suitable source under pressure. When the torch is used underwater, the return lead from the source of current is connected to the metal object to be cut or otherwise grounded. When the electrode is brought into the close proximity of the object and is electrically energized and oxygen is passed therethrough, an electric arc is formed that heats the metal to a high temperature and the metal then unites chemically with the oxygen leaving a cut therein.

It has been the past practice to introduce both the electric energy and the oxygen to the electrode at an end thereof. Such construction usually entails mounting the electrode in some type of tubular holder that conducts current to the electrode and at the same time carries oxygen thereto. It has been found that extraneous electric arcing frequently occurs in the tube and that such arcing in the presence of oxygen burns the tube and renders it inoperative after only a short period of use.

I have found that the disadvantage of short life may be overcome by designing a torch in which oxygen is carried to the electrode in a conduit preferably made from some material that does not conduct electricity, and in which electric energy is conducted to the electrode by separate means, with the connection thereto being located at a point remote from the point at which oxygen is introduced. In such construction no part of the torch, except the electrode, carries both electric energy and oxygen, the electrode being necessarily an expendable element that must frequently be replaced in any type of construction. Thus there is no opportunity for extraneous arcing in the presence of oxygen in any part of such a torch, except in the electrode where it does no harm.

It is accordingly the principal object of the present invention to provide a cutting torch of the oxy-arc type suitable for underwater work and that has an increased useful life brought about by a construction in which no part of the torch, except the electrode, carries both electric energy and oxygen.

It is a further object of the invention to provide for carrying out the foregoing object in an economical, facile and efficient manner.

In accomplishing these and other objects of the present invention, I have provided improved details of structure, the preferred form of which is illustrated in the accompanying drawing, wherein the sole figure is a longitudinal sectional view of a cutting torch embodying the principles of my invention.

Referring more in detail to the drawing:

The torch is designated generally as 1.

The torch 1 comprises a gas valve 2, which may be of any suitable known construction. As here shown, the valve includes a body 3, an inlet pipe 4, an operating handle 5, a plunger 6 and an outlet pipe 7. The inlet pipe 4 is secured to the body 3 and is adapted to be connected to a suitable source of oxygen gas under pressure. The handle 5 is pivotally connected to the body 2 and the plunger 6 is slidably fitted within the body in cooperative relation to the handle. The valve may be opened to permit flow of gas by manually depressing the handle and plunger. Appropriate means are provided to maintain the handle and plunger in outward or closed position except when manual pressure is applied to the handle. The outlet pipe 7 is secured to the valve beyond the plunger 6.

Suitably secured to the outlet pipe 7 of the valve 2, as by the threaded means shown, is a gas chamber 8, which has an outlet tube 9. The forward portion of the gas chamber has a wall 10 that is impervious to the flow of gas. Forward of the wall 10 is a boss 11 which is preferably interiorly threaded. Preferably the gas chamber 8 is made of some easily worked metal such as brass or aluminum and the outlet tube 9, the wall 10 and the boss 11 are integral therewith.

An electrical insulator 12 is secured to the forward end portion of the gas chamber 8, preferably by threaded engagement with the boss 11. The insulator 12 supports the electrical elements of the torch. Preferably it has a threaded bore in the forward end to which the electrical elements are secured. Preferably the insulator 12 is made of a suitable plastic composition.

As here shown, a conducting nipple 13 is threadedly engaged within the bore of the insulator 12. The nipple 13 likewise has a threaded bore in the forward end thereof.

A conducting plunger 14 is secured to the forward end of the nipple 13. Preferably the plunger 14 has a rearward threaded portion 15 engaged within the threaded bore of the nipple 13 and a forward threaded portion 16. Preferably the plunger 14 is made of a mild steel or other suitable ferrous material.

The central portion of the plunger 14 is preferably surrounded by a bushing 17 which has a longitudinal opening therethrough. The forward portion of the opening is preferably threaded and threadedly engaged with the forward threaded portion 16 of the plunger 14. Preferably the bushing 17 is also made of a mild steel or other suitable ferrous material.

An electrical lead 18, adapted to be connected to a suitable source of current of high amperage sufficient to produce a cutting arc, is secured to the plunger 14 between the shoulders formed by the forward end of the nipple 13 and the rearward end of the bushing 17. The lead 18 may be tightly secured in place by tightening on the respective threaded engagements.

It will be seen that the nipple 13 of conducting material performs the functions of furnishing a secure mechanical support for the plunger 14 and of furnishing a good electrical connection for the lead 18. The principal function of the bushing 17 is to furnish a good connection for the opposite side of the lead 18.

The bushing 17 is preferably surrounded by a handle member 19 made of insulating material, preferably of suitable plastic composition.

An electric conducting head 20, having a longitudinal threaded bore 21 in the rearward end thereof and an oblique transverse opening 22 therethrough, is threadedly engaged with the forward threaded portion 16 of the plunger 14. The end of the bore 21 extends through the rearward wall of the transverse opening 22 for a purpose to be hereinafter explained. Preferably the head 20 is made of brass or aluminum or other easily worked metal.

The head 20 is preferably surrounded by a cover 23 of insulating material, preferably of suitable plastic composition. The cover 23 has openings in the side walls aligned with the transverse opening 22 in the head 20.

A standard cutting electrode 24 is fitted through the transverse opening 22 in the head 20 and the openings in the side walls of the cover 23. The openings are made of a diameter suitable to receive an electrode of the desired diameter. The electrode is preferably made of suitable ferrous material and is in the form of an elongated tube having a longitudinal opening 25 passing therethrough. The ends 26 and 27 of the electrode protrude from either side of the cover 23 through the openings therein. The end 26 is adapted to perform the actual cutting operation. The end 27 is adapted to receive a flexible conduit 28 of suitable non-conducting material extending from the outlet tube 9 of the gas chamber 8, the conduit 28 being connected to the outlet tube 9 by means of an appropriate fitting 29. A portion of the length of the electrode 24 between the cover 23 and the end 26 is covered by suitable insulating material 30.

The electrode is secured within the head 20 by frictional engagement with the forward end of the plunger 14. This engagement also furnishes the electrical connection to the electrode. When it is desired to remove or replace an electrode, loosening of the head 20 on the threads 16 of the plunger 14 withdraws the forward end of the plunger from engagement with electrode and the latter can then be withdrawn from the head or another electrode can be inserted, after which the head is again tightened to renew the engagement.

*Operation*

When it is desired to utilize the torch for underwater cutting, the inlet pipe 4 to the valve 2 is connected to a suitable source of oxygen gas under pressure and the electric lead 18 is connected to a suitable source of electric current of high amperage suitable for producing a cutting arc. The return lead from the source of current is connected to the object to be cut or otherwise suitably grounded. The flow of current to the torch is regulated by external means not shown.

The torch is ordinarily carried underwater by a diver who wears electrically insulated clothing. The torch is ordinarily gripped around the inlet pipe 4 and handle 5. The end 26 of the electrode 24 is brought into close proximity to the object to be cut.

The current flows through the lead 18 and the plunger 14 to the electrode 24. The flow of oxygen is started by manually depressing the handle 5 and plunger 6 of the valve 2. Oxygen flows from the inlet pipe 4, through the valve 3, the gas chamber 8, the conduit 28 to the electrode 24.

An electric arc is formed between the end 26 of the electrode and the object to be cut. The intense heat of the arc causes the oxygen to unite with the metal leaving a cut therein.

It will be seen that the electric current and the oxygen follow separate paths through the torch until they reach the electrode 24. Such construction prevents any extraneous arcing in the torch, such as burns the parts of the torch and renders the latter inoperative.

When it is desired to replace an electrode, the electrode may be removed by the process hereinbefore described and a new one inserted.

In some instances it may be desirable to extend the cutting end 26 of the electrode 24 from the head 20 in the opposite direction from that shown. This change can readily be made by merely inserting the electrode through the head from the opposite direction and connecting the end 27 thereof to the fitting 29 of the outlet 9 by a conduit of suitable length.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A cutting torch comprising a gas valve having an inlet adapted to be connected to a source of oxygen gas under pressure, an outlet, and means to regulate the flow of gas therethrough, a gas chamber secured adjacent its rear end to the outlet of said valve and having an outlet tube in a side wall thereof, an electrical insulator secured to said gas chamber adjacent the forward end thereof, an electrical conducting nipple secured to the forward end of said insulator having a threaded bore in the forward end thereof, an elongated electrical conducting plunger having forward and rearward threaded portions, the rearward threaded portion of said plunger being threadedly engaged with the threaded bore in said nipple, an electrical insulator handle member surrounding the central portion of said plunger, in spaced relation to said nipple, said plunger being adapted to receive an electric lead in the space between said handle member and said nipple, an electrical conducting head having a longitudinally threaded bore engaged with the forward threaded portion of said plunger and having a transverse opening passing therethrough in position to be entered by the forward end portion of said plunger, an insulating cover secured around the outer surface of said head and having openings in the side walls thereof aligned with the transverse opening in said head, an elongated tubular electrode passing through the openings in the side walls of said cover and the transverse opening in said head, a side wall of said electrode being adapted to contact the forward end of said plunger, and conduit means connecting the outlet in said gas chamber and one end of said electrode.

2. A cutting torch comprising a gas valve having an inlet adapted to be connected to a source of oxygen gas under pressure, an outlet, and means to regulate the flow of gas therethrough, a gas chamber secured adjacent its rear end to the outlet of said valve and having an outlet, an electrical insulator secured to said gas chamber adjacent the forward end thereof, an electrical conducting nipple secured to the forward end of said insulator and having a threaded bore in the forward end thereof, an elongated electrical conducting plunger having forward and rearward threaded portions, the rearward threaded portion of said plunger being threadedly engaged with the threaded bore in said nipple, said plunger being adapted to receive an electric lead, an electrical conducting head having a longitudinally threaded bore engaged with the forward threaded portion of said plunger and a transverse opening passing therethrough in position to be entered by the forward end portion of said plunger, an elongated tubular electrode passing through the transverse opening in said head, a side wall of said electrode being adapted to contact the forward end of said plunger, and conduit means connecting the outlet in said gas chamber and one end of said electrode.

3. A cutting torch comprising a gas valve having an inlet adapted to be connected to a source of oxygen gas under pressure, an outlet, and means to regulate the flow of gas therethrough, a gas chamber secured adjacent its rear end to the outlet of said valve and having an outlet, electrical insulating means secured to said gas chamber adjacent the forward end thereof, an elongated electrical conducting plunger having a forward threaded portion, means securing said plunger to said insulating means, said plunger being adapted to receive an electric lead, an electrical conducting head having a longitudinally threaded bore engaged with the forward threaded portion of said plunger and having a transverse opening passing therethrough in position to be entered by the forward end portion of said plunger, an elongated tubular electrode passing through the transverse opening in said head, a side wall of said electrode being adapted to contact the forward end of said plunger, and conduit means connecting the outlet in said gas chamber and one end of said electrode.

4. A device of the character described comprising means for holding a hollow electrode including a plunger serving as a conductor for carrying current to the electrode, an electrically conducting head having a longitudinal bore portion engaged with said plunger and having a transverse opening therethrough for receiving the electrode, said bore portion communicating with said transverse opening, whereby an end of said plunger may extend into said transverse opening and into contact with said electrode to hold said electrode in position, and means for feeding oxygen to the electrode.

5. A device for supplying simultaneously electric current and gas to a hollow electrode for electric arc welding or for electric arc cutting or the like in an atmosphere of gas, comprising a holder body having an interior passage, means for connecting said passage to a source of gas, a push connection to said passage and adapted to receive through it the end of an electrode and seal thereto, a gripping member for maintaining the electrode in said position and means for supplying electric current to the said gripping member.

ROSCOE C. HUNTER.

REFERENCES CITED

The following references are of record in the file of this patent:

UNITED STATES PATENTS

| Number | Name | Date |
|---|---|---|
| 1,137,834 | Bowers | May 4, 1915 |
| 1,324,337 | Chapman et al. | Dec. 9, 1919 |
| 1,599,259 | Welch | Sept. 7, 1926 |
| 1,609,859 | Bond | Dec. 7, 1926 |
| 1,927,135 | Sammons | Sept. 19, 1933 |